US010410360B2

(12) United States Patent
Bagnall et al.

(10) Patent No.: US 10,410,360 B2
(45) Date of Patent: Sep. 10, 2019

(54) METHOD FOR DISPLAYING OFF-SCREEN TARGET INDICATORS IN MOTION VIDEO

(71) Applicant: The United States of America as represented by the Secretary of the Navy, Washington, DC (US)

(72) Inventors: Bryan D. Bagnall, San Diego, CA (US); Joshua Harguess, San Diego, CA (US); Shibin Parameswaran, San Diego, CA (US); Martin T. Jaszewski, San Diego, CA (US)

(73) Assignee: United States of America as Represented by Secretary of the Navy, Washington, DC (US)

( * ) Notice: Subject to any disclaimer, the term of this patent is extended or adjusted under 35 U.S.C. 154(b) by 89 days.

(21) Appl. No.: 15/844,008

(22) Filed: Dec. 15, 2017

(65) Prior Publication Data

US 2019/0188868 A1 Jun. 20, 2019

(51) Int. Cl.
*G06T 7/246* (2017.01)
*G06T 7/277* (2017.01)
*G06T 7/73* (2017.01)

(52) U.S. Cl.
CPC .............. *G06T 7/251* (2017.01); *G06T 7/277* (2017.01); *G06T 7/75* (2017.01);
(Continued)

(58) Field of Classification Search
None
See application file for complete search history.

(56) References Cited

U.S. PATENT DOCUMENTS

| 4,286,289 A | 8/1981 | Ottesen et al. |
| 6,674,877 B1 * | 1/2004 | Jojic ................... G06K 9/00369 348/169 |

(Continued)

FOREIGN PATENT DOCUMENTS

WO WO2008052254 5/2008

OTHER PUBLICATIONS

Baudisch et al., "Halo: a Technique for Visualizing Off-Screen Locations," Proc. Conference on Human factors in Computing Systems (CHI), vol. No. 5, Issue No. 1, pp: 481-488. (Year: 2003).*

(Continued)

*Primary Examiner* — Soo Shin
(74) *Attorney, Agent, or Firm* — Naval Information Warfare Center Pacific; Kyle Eppele (57) ABSTRACT

A method for displaying off-screen target indicators in motion video comprising the steps of receiving motion video containing a series of individual video frames, selecting a target object within a selected video frame by choosing selected target object pixel space coordinates, and determining whether the selected target object pixel space coordinates are within the selected video frame. Upon determining that the selected target object pixel space coordinates are within the selected video frame, the method updates a dynamical system model with the target object geographical coordinates, longitudinal target object speed, and latitudinal target object speed. Upon determining that the selected target object pixel space coordinates are not within the selected video frame, the method calculates estimated target object geographical coordinates at time t using the dynamical system model. The method then calculates final values in the video field of view at which to draw a target indicator.

20 Claims, 6 Drawing Sheets

(52) U.S. Cl.
CPC .............. *G06T 2207/10016* (2013.01); *G06T 2207/20092* (2013.01); *G06T 2207/30241* (2013.01)

(56) References Cited

U.S. PATENT DOCUMENTS

| | | | |
|---|---|---|---|
| 8,512,115 B2 | 8/2013 | Namba et al. | |
| 8,958,602 B1 | 2/2015 | Lane et al. | |
| 2007/0031003 A1* | 2/2007 | Cremers | G06K 9/6207 382/103 |
| 2011/0129119 A1* | 6/2011 | Eggert | G06T 7/20 382/103 |
| 2012/0322523 A1 | 12/2012 | Woodard et al. | |
| 2014/0375493 A1* | 12/2014 | Weisenburger | G01S 19/48 342/357.3 |
| 2017/0178355 A1* | 6/2017 | Alibay | G06T 7/70 |
| 2018/0239966 A1* | 8/2018 | Xiao | G06K 9/6249 |

OTHER PUBLICATIONS

Gustafson et al., "Comparing visualizations for tracking off-screen moving targets," Proc. Conference on Human factors in Computing Systems (CHI), 2007 ACM Press pp: 2399-2404. (Year: 2007).*
Gao et al., "A Kalman Filtering Perspective for Multiatlas Segmentation," SIAM J Imaging Sci. 2015 ; 8(2): 1007-1029. doi:10.1137/130933423. (Year: 2015).*

* cited by examiner

METHOD FOR DISPLAYING OFF-SCREEN TARGET INDICATORS IN MOTION VIDEO

FEDERALLY SPONSORED RESEARCH AND DEVELOPMENT

The Method for Displaying Off-Screen Target Indicators in Motion Video is assigned to the United States Government and is available for licensing and commercial purposes. Licensing and technical inquiries may be directed to the Office of Research and Technical Applications, Space and Naval Systems Center Pacific (Code 72120), San Diego, Calif., 92152 via telephone at (619) 553-2778 or email at ssc_pac_t2@navy.mil. Reference Navy Case 103403.

BACKGROUND OF THE INVENTION

This invention provides a method that can automatically display indicators in real time showing the direction and distance to an off-screen target. It is designed as a way for an operator of any platform equipped with a motion video sensor to be able to maintain situational awareness. The operator may allow the method to detect targets automatically, or may select targets manually. The method then computes the location of the target relative to the video field of view and displays the information on screen. This allows the camera operator to easily reorient the camera toward the off-screen targets with minimal cognitive burden. The same information used to display the target locations could also be translated into a signal for motors which could automatically orient the camera to the off-screen target.

It can be especially difficult to maintain orientation with respect to a target object while operating a camera attached to a moving platform. This invention addresses lowering the cognitive burden required to point the camera at previously spotted target objects or previously known geographic coordinates. When scanning a scene with a camera, it can be difficult to determine which way the camera needs to be panned to go back towards the object once the target object leaves the camera's field of view.

Current methods employed in the field include displaying the camera platform heading on the video screen. While this can help keep the operator oriented, this method requires the operator to remember the bearings to the target objects the operator is monitoring and estimate for himself the motion of the object while outside the field of view. By contrast, the present invention addresses these shortcomings by tracking target object locations, updating them based on a predictive dynamical model, and automatically displays a target indicator showing where the camera needs to turn in order to point towards the target object.

In a different field, video games have used a similar indicator to display the location of objects within the video game environment but outside of the user's field of view that the user is trying to find. In contrast to the present invention however, the video game programmer is able to directly compute the locations of the targets relative to the field of view because all of the object locations in a video game environment are precisely known to the programmer. Unlike the method used by video games, this invention does not need to know the precise location of the target objects and uses instead a dynamical model to predict the target object location relative to the video camera field of view.

SUMMARY OF THE INVENTION

The present invention is for a method for displaying off-screen target indicators in motion video comprising the steps of receiving motion video containing a series of individual video frames, selecting a target object within a selected video frame by choosing selected target object pixel space coordinates, and determining whether the selected target object pixel space coordinates are within the selected video frame. Upon determining that the selected target object pixel space coordinates are within the selected video frame, the method updates a dynamical system model with the target object geographical coordinates, longitudinal target object speed, and latitudinal target object speed. Upon determining that the selected target object pixel space coordinates are not within the selected video frame, the method calculates estimated target object geographical coordinates at time t using the dynamical system model. The method then calculates final values in the video field of view at which to draw a target indicator.

BRIEF DESCRIPTION OF THE DRAWINGS

Throughout the several views, like elements are referenced using like elements. The elements in the figures are not drawn to scale, and some dimensions may be exaggerated for clarity.

DETAILED DESCRIPTION OF THE INVENTION

While the invention may be embodied in different forms, the drawings and this section describe in detail specific embodiments of the invention with the understanding that the present disclosure is to be considered merely a preferred embodiment of the invention, and is not intended to limit the invention in any way.

This invention may be practiced using motion video cameras, and provides a method that can automatically generate and draw target indicators which indicate the direction and distance to an off-screen target. The motion video contains metadata including the position the video was taken at each video frame. This metadata enables the longitude and latitude coordinates of the target object to be calculated.

Figure 1:
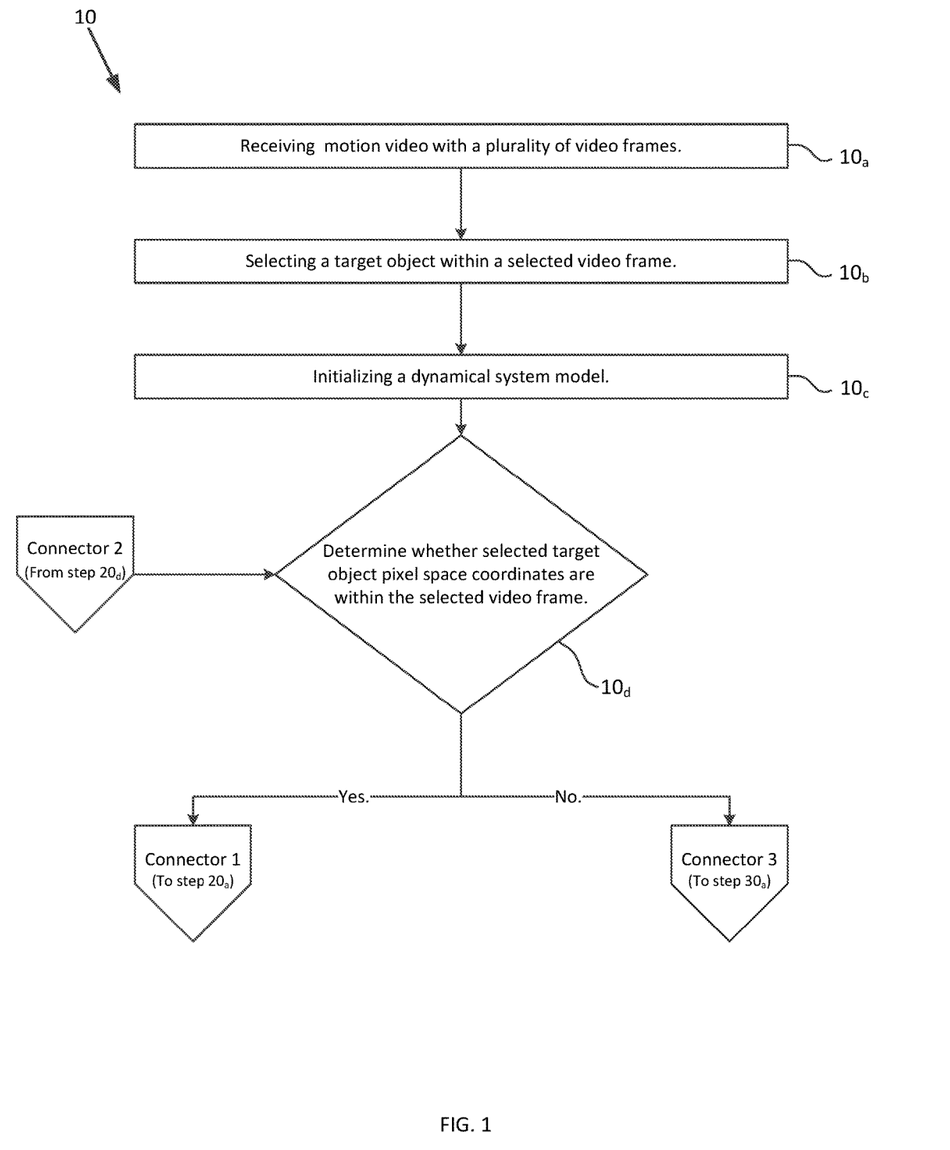
FIG. 1 is a flowchart of a method for displaying off-screen target indicators in motion video, in accordance with one embodiment of the present disclosure.

Using the present method, the operator initially receives motion video containing a plurality of video frames and positional metadata, step $10_a$, depicted in FIG. 1. The operator has the choice of allowing the method to automatically detect targets, or manually selecting targets that the operator would like to track. In either case, the operator or method selects a target object within a selected video frame, step $10_b$. The method initializes a four-state dynamical system model such as a Kalman filter (other non-linear trackers such as particle filters may be used in the alternate), which tracks at least the target object geographical coordinates (in longitude and latitude) and the target object velocity (in longitudinal target object speed and latitudinal target object speed), step $10_c$. The dynamical system model is initialized in step $10_c$ with the location of the tracked target, converted from pixel coordinates to geographical coordinates using a bilinear transform based on information contained in the metadata of the video.

The method then determines whether the target object is within the field of view by testing whether the selected target object pixel space coordinates are within the selected video frame, step $10_d$. The method performs step $10_d$ by checking the pixel space coordinates of the tracked target (x,y,z) (where x is the column coordinate, y is the row coordinate, and z is 1 if the target is in front of the field of view, and −1 if the target is behind the field of view) against the width and height of the selected video frame $(x_{lim}, y_{lim})$. The method first checks if the conditions defined by equations 1-3 (below) are true:

$$z \geq 0; \qquad (1)$$

$$0 < x < x_{lim}; \text{ and} \qquad (2)$$

$$0 < y < y_{lim}. \qquad (3)$$

Figure 2:
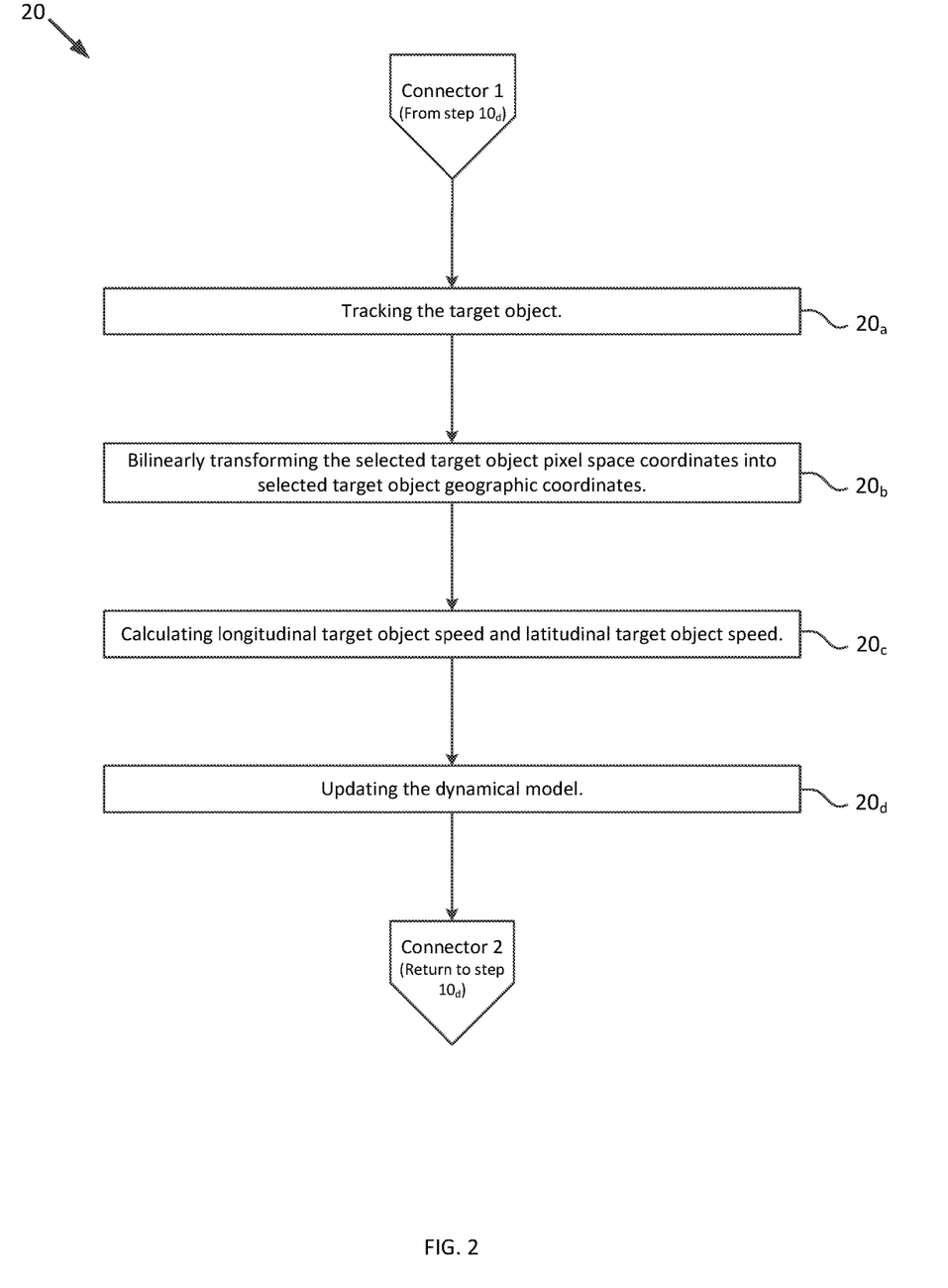
FIG. 2 is a flowchart of a method for displaying off-screen target indicators in motion video, in accordance with one embodiment of the present invention, and is a continuation of FIG. 1.

In step $10_d$, if the conditions define by equations 1-3 are all true, then the tracked target is still within the video frame, and the method proceeds to step $20_a$, depicted in FIG. 2. In step $20_a$, while the target object is within the field of view, the target object is tracked from frame to frame. The target object can be tracked in step $20_a$ by tracking the target object's key points (e.g., using the Scale Invariant Feature Transform or Speeded Up Robust Features tracking), template matching, correlation filters, Tracking-Learning-Detection, or other methods. Within step $20_a$, the updated selected target object pixel space coordinates are extracted from the tracker for each new frame.

Next, a bilinear transform is used to convert the selected object pixel space coordinates from the pixel space to selected object geographical coordinates in longitude and latitude, step $20_b$. For each new frame where the target object is within the field of view, the tracker of step $20_a$ reports the target object pixel space coordinates in row and column number. Using geo-location information from the video metadata, each pixel in the video frame may be mapped to a real-world longitude and latitude using the bilinear transform, step $20_b$. The target object pixel space coordinates can then be correlated with a real world longitude and latitude. Additionally, the bilinear transform of step $20_b$ may be substituted with an alternative means for conversion from pixel coordinates to geographic coordinates such as a bicubic transform.

The longitudinal target object speed and latitudinal target object speed can now be calculated in step $20_c$. Where the target object geographical coordinates are known for each frame and the framerate of the video is known, the method can calculate the speed of the target object. For example, a ship may appear at 33.213° N, 117.321° W at a time $t_0$. In a later frame corresponding to time $t_1$, the ship may appear at 33.345° N, 117.789° W. The method can calculate or estimate the distance between the two points using known methods such as the Haversine formula (in this case, approximately 29 miles). If the time between the first video frame at $t_0$ and second video frame at $t_1$ is one hour, then we know the speed of the target is approximately 29 miles per hour. After the longitudinal target object speed and latitudinal target object speed is calculated in step $20_c$, the dynamical model can be updated with the selected target object geographic coordinates, longitudinal target object speed, and latitudinal target object speed, step $20_d$. The method then returns to step $10_d$.

Figure 3:
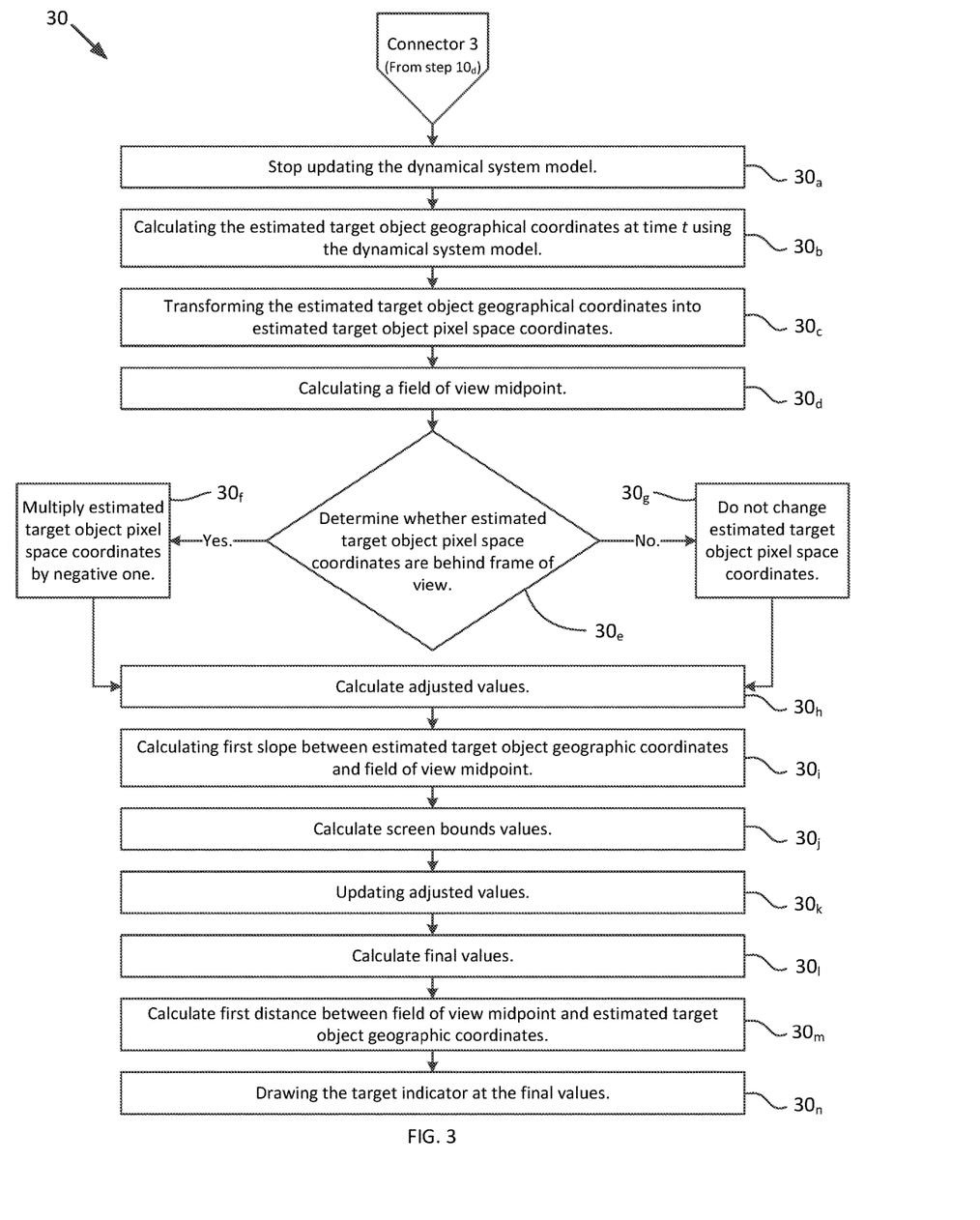
FIG. 3 is a flowchart of a method for displaying off-screen target indicators in motion video, in accordance with one embodiment of the present invention, and is a continuation of FIG. 1.
Figure 4:
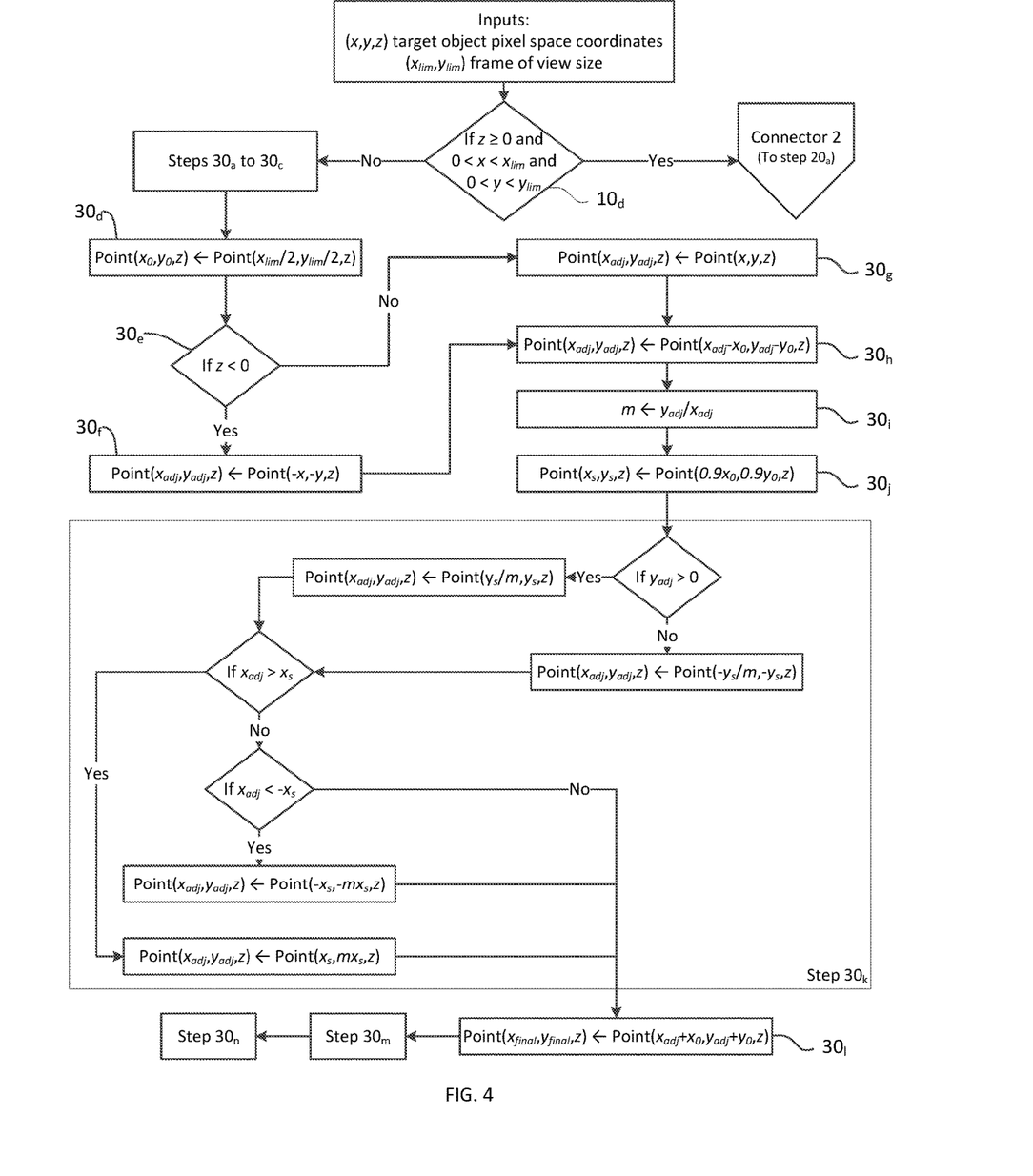
FIG. 4 is a flowchart of a method for displaying off-screen target indicators in motion video, in accordance with one embodiment of the present invention, and depicts the steps of FIGS. 1 and 3 in greater detail.

Once the target object is no longer within the video frame, the target object cannot be directly tracked, and the dynamical model no longer updated. At step $10_d$, if any of equations 1, 2, or 3 are false, then the target object is no longer within the field of view, and the method proceeds to step $30_a$, depicted in FIG. 3. First, the dynamical system model updates are stopped, step $30_a$. Next, the current location of the target object at time t is estimated using the dynamical system model, step $30_b$. Because the dynamical system model (a Kalman filter in this embodiment) produces the same output dimensions as are input, the results of step $30_b$ are estimated target object geographical coordinates output in longitude and latitude. These estimated target object geographical coordinates must be transformed into estimated target object pixel space coordinates, step $30_c$. The estimated target object pixel space coordinates in row and column at time t is depicted as (x,y,z) (where x is the column coordinate, y is the row coordinate, and z is 1 if the target is in front of the field of view, and −1 if the target is behind the field of view). The field of view midpoint $(x_0, y_0, z)$ is next calculated in step $30_d$ according to equation 4:

$$(x_0, y_0, z) = \left(\frac{x_{lim}}{2}, \frac{y_{lim}}{2}, z\right). \qquad (4)$$

After calculating the field of view midpoint in step $30_d$, the method determines whether the estimated target object pixel space coordinates (x,y,z) are behind the frame of view. If z<0, then the target object is behind the frame of view, and the estimated target object pixel space row and column values must be multiplied by −1 and saved as adjusted values $(x_{adj}, y_{adj}, z)$, according to equation 5 below, step $30_f$:

$$(x_{adj}, y_{adj}, z) \leftarrow (-x, -y, z). \qquad (5)$$

If the estimated target object pixel space coordinates (x,y,z) are not behind the frame of view (if z≥0), then the adjusted values $(x_{adj}, y_{adj}, z)$ are simply set as the unchanged estimated target pixel space coordinates (x,y,z), step $30_g$, equation 6 below.

$$(x_{adj}, y_{adj}, z) \leftarrow (x, y, z). \qquad (6)$$

Next, adjusted values $(x_{adj}, y_{adj}, z)$ are calculated according to step $30_h$, equation 7:

$$(x_{adj}, y_{adj}, z) = (x - x_0, y - y_0, z). \qquad (7)$$

The slope of the line connecting the field of view midpoint and the target object (hereinafter "first slope") can be calculated in step $30_i$ according to equation 8:

$$m = \frac{y_{adj}}{x_{adj}} = \frac{y - y_0}{x - x_0}. \qquad (8)$$

Screen bounds values $(x_s, y_s, z)$ are then calculated in step $30_j$ according to equation 9:

$$(x_s, y_s, z) = (0.9 x_0, 0.9 y_0, z). \qquad (9)$$

The adjusted values ($x_{adj}, y_{adj}, z$) are then updated in step $30_k$.

In step $30_k$, the method first checks if $y_{adj} > 0$. If $y_{adj} > 0$, then the method updates the adjusted values according to equation 10:

$$(x_{adj}, y_{adj}, z) = \left(\frac{y_s}{m}, y_s, z\right). \quad (10)$$

If $y_{adj} \leq 0$ however, then the adjusted values are instead updated according to equation 11:

$$(x_{adj}, y_{adj}, z) = \left(-\frac{y_s}{m}, -y_s, z\right). \quad (11)$$

After having updated the adjusted values according to equation 10 or equation 11, the method checks whether $x_{adj} > x_s$. If this condition is true, then the adjusted values are further updated according to equation 12:

$$(x_{adj}, y_{adj}, z) = (x_s, mx_s, z). \quad (12)$$

If the condition $x_{adj} > x_s$ is not true, then the method checks if the condition $x_{adj} < -x_s$ is true. If $x_{adj} < -x_s$, then the adjusted values are further updated according to equation 13:

$$(x_{adj}, y_{adj}, z) = (-x_s, -mx_s, z). \quad (13)$$

After having updated the adjusted values ($x_{adj}, y_{adj}, z$), the method now calculates final values ($x_{final}, y_{final}, z$) according to equation 14, step $30_l$:

$$(x_{final}, y_{final}, z) = (x_{adj} + x_0, y_{adj} + y_0, z). \quad (14)$$

Additionally, the distance (hereinafter "first distance") between the field of view midpoint and the tracked target can be calculated using the known longitude and latitude of the screen center from the video metadata, estimated target object geographical coordinates, and the Haversine formula, step $30_m$. A target indicator is finally drawn at the final values ($x_{final}, y_{final}, z$) on the video frame, step $30_n$. This target indicator can be annotated with the distance to the target object, calculated in step $30_m$. The above steps are shown in flow chart format in FIGS. 1, 2, 3, and 4.

Figure 5:
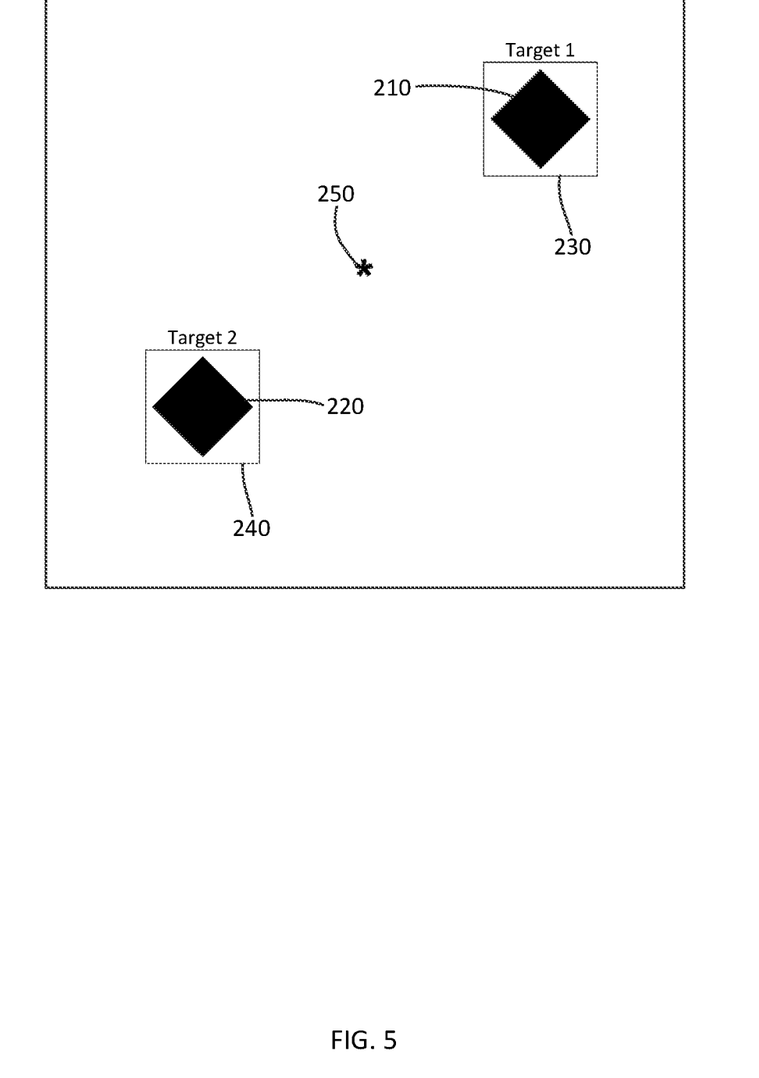
FIG. 5 depicts a display screen showing targets in a field of view in accordance with one embodiment of the present invention.

FIG. 5 is a display screen 205 showing targets 210, 220 in the field of view, in accordance with one embodiment of the present disclosure. The first target 210 can be seen on the right side of the display screen 205. The second target 220 can be seen on the left side of the display screen 205. The user can manually select targets 210, 220 by drawing a first box 230 around target 210 and a second box 240 around target 240. Alternatively, the method may have automatically detected targets 210, 200 and assigned coordinates to the targets 210, 200 by generating and displaying boxes 230, 240 around the targets 210, 220. A center indication 250 may appear at on display screen 205 to indicate the very center of the image. As targets 210, 220 move, they may exit the field of view of display screen 205.

Figure 6:
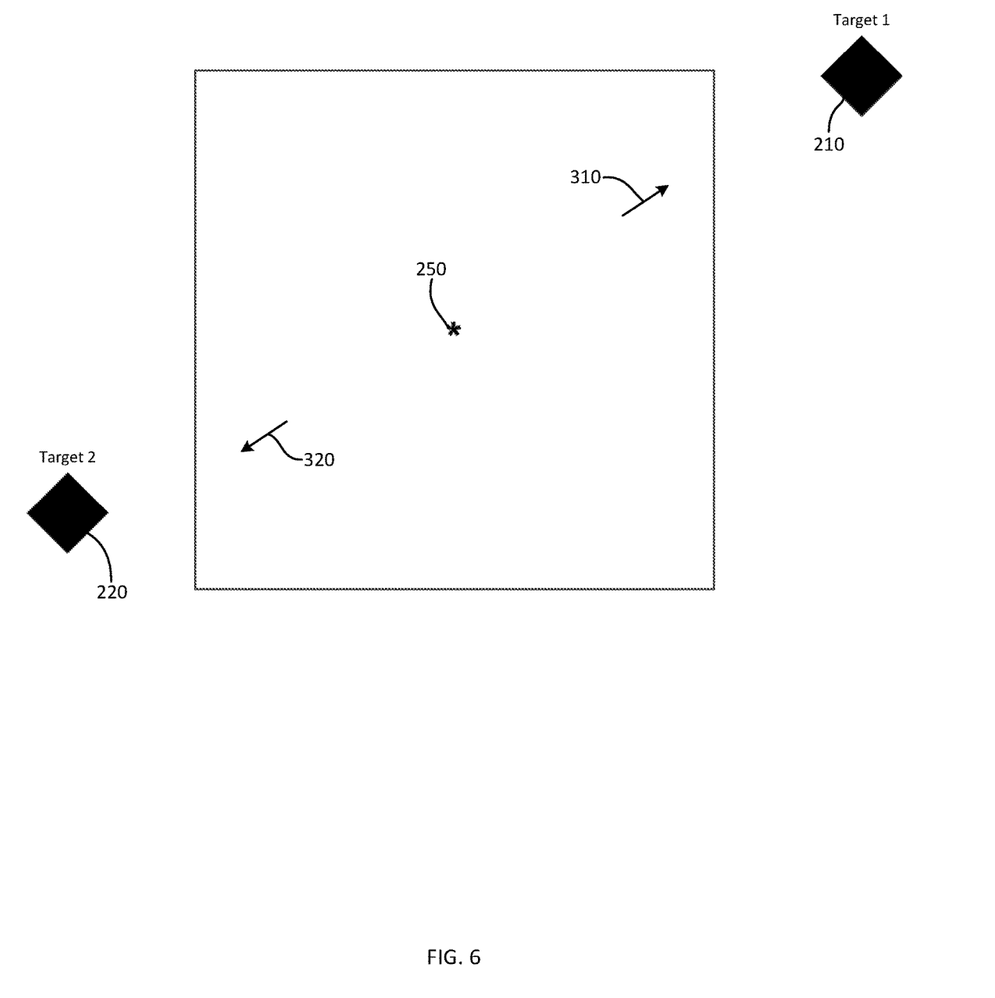
FIG. 6 depicts a display screen showing the targets of FIG. 5 after they have departed the field of view in accordance with one embodiment of the present invention.

FIG. 6 shows the targets of FIG. 5 as they have veered off-screen in accordance with one embodiment of the present disclosure. The wider field of view shows the physical locations of targets 210, 220 after they have moved out of the frame of view of the display screen 205. In the embodiment shown in FIG. 6, the indicators 310, 320 are shown in the form of arrows in order to represent the direction of off-screen targets 210, 220. These indicators 310, 320 could further depict the distance from each of targets 210, 220 to the center of the display screen 205.

From the above description of the present invention, it is manifest that various techniques may be used for implementing its concepts without departing from the scope of the claims. The described embodiments are to be considered in all respects as illustrative and not restrictive. The method disclosed herein may be practiced in the absence of any element that is not specifically claimed and/or disclosed herein. It should also be understood that the present invention is not limited to the particular embodiments described herein, but is capable of being practiced in many embodiments without departure from the scope of the claims.

We claim:

1. A method for displaying target indicators in motion video comprising:
    receiving a motion video containing a plurality of video frames;
    initializing a dynamical system model;
    selecting a target object within a selected video frame by choosing selected target object pixel space coordinates;
    determining whether the selected target object pixel space coordinates are within the selected video frame;
    upon determining the selected target object pixel space coordinates are within the selected video frame,
        updating the dynamical system model with a target object geographical coordinates, longitudinal target object speed, and latitudinal target object speed;
    upon determining the selected target object pixel space coordinates are not within the selected video frame,
        calculating an estimated target object geographical coordinates at time t using the dynamical system model;
    calculating a final value for the dynamical system model; and
    drawing the target indicators at the final value for the dynamical system model.

2. The method of claim 1, wherein the step of upon determining the selected target object pixel space coordinates are within the selected video frame further comprises sub steps of
    tracking the selected target object pixel space coordinates;
    bilinearly transforming the selected target object pixel space coordinates into selected target object geographical coordinates; and
    calculating the longitudinal target object speed and the latitudinal target object speed using the selected target object geographical coordinates.

3. The method of claim 1, wherein the longitudinal target object speed is calculated as a circle distance in a longitudinal direction between selected target object geographical coordinates in the selected video frame and the selected target object geographical coordinates in a previous video frame.

4. The method of claim 1, wherein the upon determining the selected target object pixel space coordinates are not within the selected video frame step further comprises substeps of
    stopping the updating of the dynamical system model;
    calculating an estimated target object geographical coordinates at the time t using the dynamical system model; and
    transforming the estimated target object geographical coordinates into estimated target object pixel space coordinates.

5. The method of claim 4, further comprising a step of calculating a field of view midpoint.

6. The method of claim 4, further comprising steps of determining whether the estimated target pixel space coordinates are behind a frame of view;
   upon determining the target object pixel space coordinates are behind the frame of view,
      updating the target object pixel space coordinates by multiplying the target object pixel space coordinates by negative one; and
   upon determining the target object pixel space coordinates are not behind the frame of view,
      leaving the target object pixel space coordinates unchanged.

7. The method of claim 4, further comprising steps of
   calculating adjusted values by subtracting a field of view midpoint from the estimated target object pixel space coordinates;
   calculating a first slope between the estimated target object pixel space coordinates and the field of view midpoint;
   calculating screen bounds values by multiplying the field of view midpoint by 0.9;
   updating the adjusted values using the screen bounds values and the first slope; and
   calculating the final value for the dynamical system model by adding the field of view midpoint to the adjusted values.

8. The method of claim 4, further comprising a step of calculating a first distance between a field of view midpoint and the estimated target object geographic coordinates.

9. The method of claim 5, wherein the field of view midpoint is calculated by multiplying a frame of view dimension by one-half.

10. The method of claim 8, wherein the first distance is calculated by transforming the field of view midpoint into screen center geographic coordinates, and calculating a second distance between the screen center geographic coordinates and the estimated target object geographic coordinates.

11. The method of claim 8, wherein the target indicator displays the first distance.

12. The method of claim 2, wherein the dynamical system model is a Kalman filter, and wherein the target object is tracked by a key point tracking method.

13. A method for displaying target indicators in motion video comprising:
   receiving a motion video containing a plurality of video frames;
   selecting a target object within a selected video frame by choosing selected target object pixel space coordinates;
   initializing a dynamical system model;
   determining whether the selected target object pixel space coordinates are within the selected video frame;
   upon determining the selected target object pixel space coordinates are within the selected video frame,
      tracking the selected target object pixel space coordinates;
      bilinearly transforming the selected target object pixel space coordinates into selected target object geographical coordinates;
      calculating a longitudinal target object speed and a latitudinal target object speed using the selected target object geographical coordinates;
      updating the dynamical system model with the selected target object geographical coordinates, the longitudinal target object speed, and the latitudinal target object speed;
   upon determining the selected target object pixel space coordinates are not within the selected video frame,
      stopping the updating of the dynamical system model;
      calculating an estimated target object geographical coordinates at time t using the dynamical system model;
      transforming the estimated target object geographical coordinates into estimated target object pixel space coordinates;
      calculating a field of view midpoint;
      determining whether the estimated target object pixel space coordinates are behind a frame of view;
      upon determining the target object pixel space coordinates are behind the frame of view,
         updating the target object pixel space coordinates by multiplying the target object pixel space coordinates by negative one;
      upon determining the target object pixel space coordinates are not behind the frame of view,
         leaving the target object pixel space coordinates unchanged;
      calculating adjusted values by subtracting the field of view midpoint from the estimated target object pixel space coordinates;
      calculating a first slope between the estimated target object pixel space coordinates and the field of view midpoint;
      calculating screen bounds values by multiplying the field of view midpoint by 0.9;
      updating the adjusted values using the screen bounds value and the first slope;
      calculating a final value for the dynamical system model by adding the field of view midpoint to the adjusted values;
      calculating a first distance between the field of view midpoint and the estimated target object geographic coordinates; and
      drawing the target indicators at the final value for the dynamical system model.

14. The method of claim 13, wherein the longitudinal target object speed is calculated as a circle distance in a longitudinal direction between the selected target object geographical coordinates in the selected video frame and selected target object geographical coordinates in a previous video frame.

15. The method of claim 13, wherein the field of view midpoint is calculated by multiplying a frame of view dimension by one-half.

16. The method of claim 13, wherein the first distance is calculated by transforming the field of view midpoint into screen center geographic coordinates, and calculating a second distance between the screen center geographic coordinates and the estimated target object geographical coordinates.

17. The method of claim 13, wherein the target indicator displays the first distance.

18. The method of claim 13, wherein the dynamical system model is a Kalman filter.

19. The method of claim 13, wherein the target object is tracked by a key point tracking method.

20. A method for displaying target indicators in motion video comprising:
   receiving a motion video containing a plurality of video frames;
   selecting a target object within a selected video frame by choosing selected target object pixel space coordinates;
   initializing a dynamical system model;

determining whether the selected target object pixel space coordinates are within the selected video frame;
upon determining the selected target object pixel space coordinates are within the selected video frame,
    tracking the selected target object pixel space coordinates;
    bilinearly transforming the selected target object pixel space coordinates into selected target object geographical coordinates;
    calculating a longitudinal target object speed and a latitudinal target object speed using the selected target object geographical coordinates;
    updating the dynamical system model with the selected target object geographical coordinates, longitudinal target object speed, and latitudinal target object speed;
    wherein the longitudinal target object speed is calculated as a great circle distance in a longitudinal direction between the selected target object geographical coordinates in the selected video frame and the selected target object geographical coordinates in a previous video frame;
upon determining the selected target object pixel space coordinates are not within the selected video frame,
    stopping the updating of the dynamical system model;
    calculating an estimated target object geographical coordinates at time t using the dynamical system model;
    transforming the estimated target object geographical coordinates into estimated target object pixel space coordinates;
    calculating a field of view midpoint;
    determining whether the estimated target object pixel space coordinates are behind a frame of view;
    upon determining the target object pixel space coordinates are behind the frame of view,
        updating the target object pixel space coordinates by multiplying the target object pixel space coordinates by negative one;
    upon determining the target object pixel space coordinates are not behind the frame of view,
        leaving the target object pixel space coordinates unchanged;
    calculating adjusted values by subtracting the field of view midpoint from the estimated target object pixel space coordinates;
    calculating a first slope between the estimated target object pixel space coordinates and the field of view midpoint;
    calculating screen bounds values by multiplying the field of view midpoint by 0.9;
    updating the adjusted values using the screen bounds value and the first slope;
    calculating final value by adding the field of view midpoint to the adjusted values;
    calculating a first distance between the field of view midpoint and the estimated target object geographic coordinates;
    drawing a target indicator at the final value;
    wherein the field of view midpoint is calculated by multiplying a frame of view dimension by one-half;
    wherein the first distance is calculated by transforming the field of view midpoint into screen center geographic coordinates, and calculating the distance between the screen center geographic coordinates and the estimated target object geographical coordinates; wherein the target indicator displays the first distance;
wherein the dynamical system model is a Kalman filter, and wherein the target object is tracked by a key point tracking method.

* * * * *